(12) United States Patent
Abe et al.

(10) Patent No.: US 9,406,429 B2
(45) Date of Patent: Aug. 2, 2016

(54) CONTACTLESS POWER TRANSFER TRANSFORMER

(71) Applicant: TECHNOVA INC., Tokyo (JP)

(72) Inventors: Shigeru Abe, Hyogo (JP); Yasuyoshi Kaneko, Saitama (JP); Tomio Yasuda, Saitama (JP)

(73) Assignee: TECHNOVA INC., Tokyo (JP)

( * ) Notice: Subject to any disclaimer, the term of this patent is extended or adjusted under 35 U.S.C. 154(b) by 0 days.

(21) Appl. No.: 14/405,022

(22) PCT Filed: Jun. 5, 2013

(86) PCT No.: PCT/JP2013/065572
§ 371 (c)(1),
(2) Date: Dec. 2, 2014

(87) PCT Pub. No.: WO2013/183665
PCT Pub. Date: Dec. 12, 2013

(65) Prior Publication Data
US 2015/0137925 A1     May 21, 2015

(30) Foreign Application Priority Data
Jun. 5, 2012   (JP) ................................. 2012-128459

(51) Int. Cl.
*H01F 27/08* (2006.01)
*H01F 27/10* (2006.01)
(Continued)

(52) U.S. Cl.
CPC .............. *H01F 27/22* (2013.01); *B60L 11/182* (2013.01); *B60L 11/185* (2013.01);
(Continued)

(58) Field of Classification Search
CPC ....... H01F 27/22; H01F 27/085; H01F 27/10; H01F 27/24; H01F 27/288; H01F 27/362; H01F 38/14

USPC .............. 336/57, 60, 61, 212, 178, 179, 84 C
See application file for complete search history.

(56) References Cited

U.S. PATENT DOCUMENTS 7,295,092 B2 * 11/2007 Elliott ..................... H01F 17/06
336/178
8,541,977 B2   9/2013 Hasegawa et al.
(Continued)

FOREIGN PATENT DOCUMENTS

| CN | 101404203 A | 4/2009 |
|---|---|---|
| JP | 2-129716 U | 10/1990 |

(Continued)

OTHER PUBLICATIONS

International Search Report mailed Aug. 27, 2013 in PCT/JP2013/065572.

(Continued)

*Primary Examiner* — Mangtin Lian
(74) *Attorney, Agent, or Firm* — Rothwell, Figg, Ernst & Manbeck, P.C.

(57) ABSTRACT

According to one embodiment, a contactless power transfer transformer includes a both-sides wound coil. The both-sides wound coil includes an inter-magnetic-pole core portion between two magnetic pole portions. The winding wire is wound around a wound region of the inter-magnetic-pole core portion. The inter-magnetic-pole includes: a plurality of separate magnetic members that connect to each of the two magnetic pole portions, and are arranged with a spacing therebetween and in parallel with each other; and a heat conductor that is alternately arranged with respect to the separate magnetic members on a plane formed by the separate magnetic members so as to be in contact with the separate magnetic members. Heat generated by the separate magnetic members is guided to the outside of the wound region of the inter-magnetic-pole core portion through the heat conductor, and is dissipated.

7 Claims, 22 Drawing Sheets

(51) Int. Cl.
*H01F 27/24* (2006.01)
*H01F 27/22* (2006.01)
*H01F 38/14* (2006.01)
*B60L 11/18* (2006.01)
*H01F 27/255* (2006.01)
*H01F 3/14* (2006.01)
*H01F 27/34* (2006.01)

(52) U.S. Cl.
CPC ............ *B60L 11/1824* (2013.01); *H01F 3/14* (2013.01); *H01F 27/085* (2013.01); *H01F 27/10* (2013.01); *H01F 27/24* (2013.01); *H01F 27/255* (2013.01); *H01F 38/14* (2013.01); *B60L 2230/10* (2013.01); *B60L 2240/36* (2013.01); *H01F 2027/348* (2013.01); *Y02T 10/7005* (2013.01); *Y02T 10/7088* (2013.01); *Y02T 90/121* (2013.01); *Y02T 90/122* (2013.01); *Y02T 90/128* (2013.01); *Y02T 90/14* (2013.01)

(56) References Cited

U.S. PATENT DOCUMENTS 8,698,585 B2    4/2014   Takiguchi et al.
8,947,186 B2 *  2/2015   Kurs ...................... H02J 17/00
                                                  336/178

FOREIGN PATENT DOCUMENTS

| JP | 4-134815 U | 12/1992 |
| JP | 2004-14773 A | 1/2004 |
| JP | 2007-180224 A | 7/2007 |
| JP | 2008-87733 A | 4/2008 |
| JP | 2009-27025 A | 2/2009 |
| JP | 2010-172084 A | 8/2010 |
| JP | 2011-50127 A | 3/2011 |
| WO | 2011/030531 A1 | 3/2011 |

OTHER PUBLICATIONS

Yamanaka, et al., "Contactless Power Transfer System of Electric Vehicle Rapid Charger," Heisei 23 Nen the Institute of Electrical Engineers of Japan Sangyo Oyo Bumon Taikai Ronbunshu, Sep. 6, 2011, pp. II-407 to II-412.

Yamanaka, et al., "A Heat Dissipation Method of H-shaped Large Capacity Contactless Power Transformers for Electric Vehicles," Heisei 25 Nen the Institute of Electrical Engineers of Japan Jidosha Kenkyukai Shiryo, Jan. 15, 2013, pp. 31-36.

Office Action mailed Feb. 2, 2016 in corresponding Japanese Patent Application No. 2014-520025 (with an English translation) (8 pages).

Yamanaka, et al., "10 kW Contactless Power Transfer System for Rapid Charger of Electric Vehicle," EVS26 Los Angeles, California, May 6-9, 2012, EVS26 International Battery, Hybrid and Fuel Cell Electric Vehicle Symposium (9 pages).

\* cited by examiner

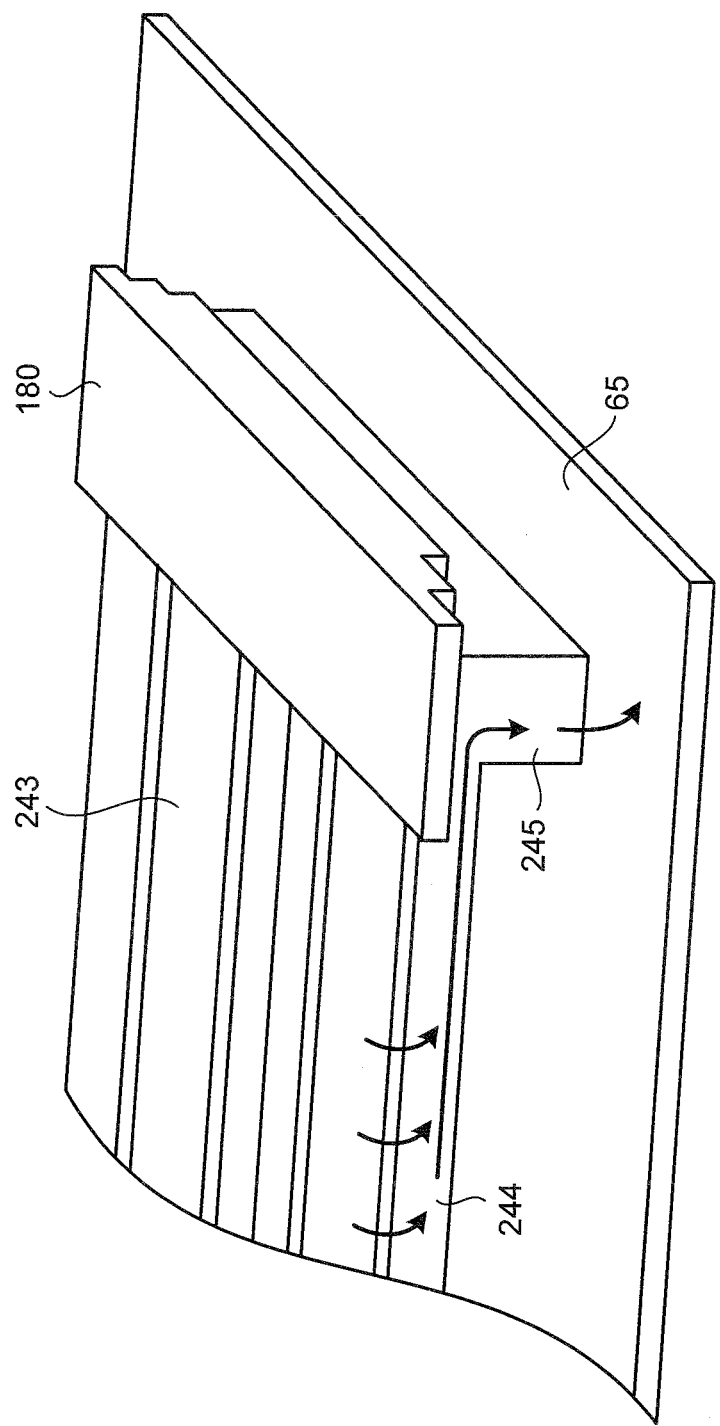

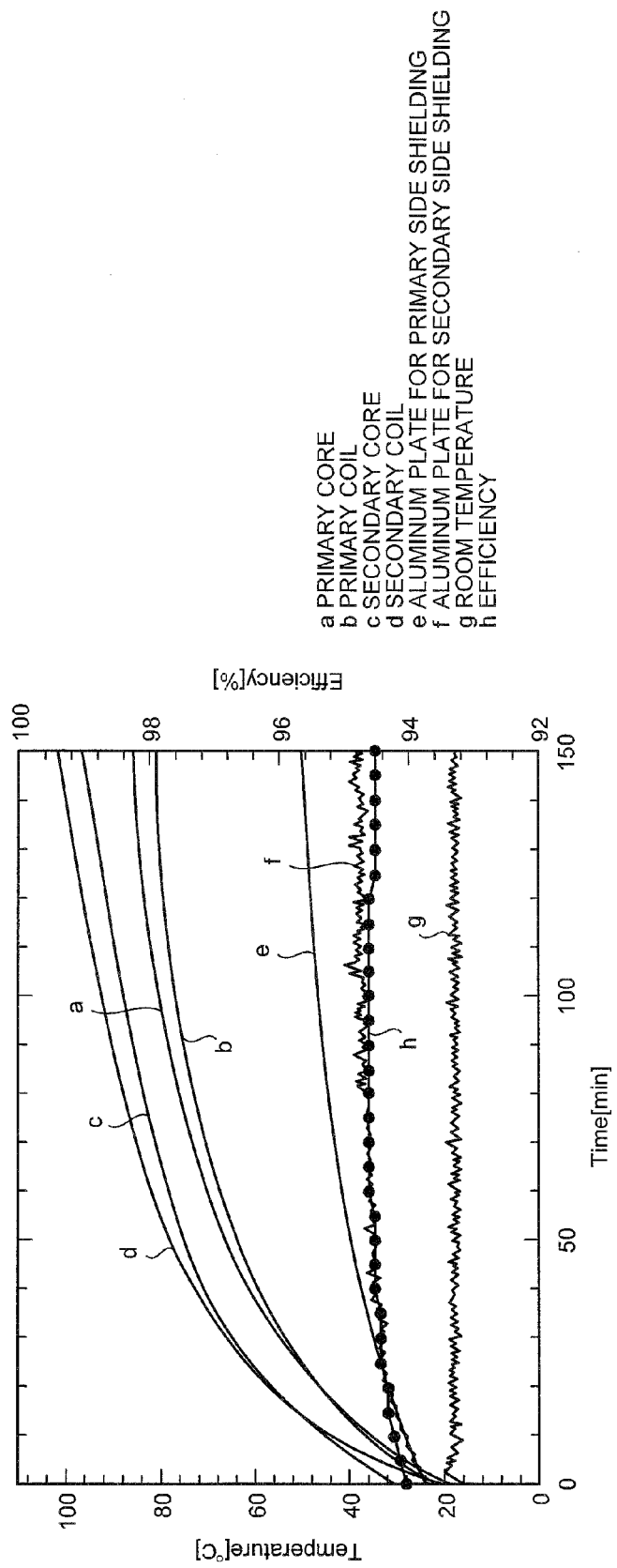

FIG.14

CHANGE IN CONSTANTS BY PRESENCE AND ABSENCE OF HEAT DISSIPATING ALUMINUM

|  | ALUMINUM PRESENT | ALUMINUM ABSENT | BEFORE COUNTERMEASURE |
|---|---|---|---|
| $r_1[m\Omega]$ | 121.1 | 109.1 | 106.9 |
| $r_2[m\Omega]$ | 8.9 | 8.1 | 9.1 |
| $l_0[\mu H]$ | 60.5 | 56.8 | 58.4 |
| $l_1[\mu H]$ | 110.3 | 103.5 | 109.9 |
| $l_2[\mu H]$ | 9.9 | 9.9 | 9.8 |
| $Cs[\mu F]$ | 0.188 | 0.200 | 0.190 |
| $Cp[\mu F]$ | 1.830 | 1.869 | 1.864 |
| k | 0.354 | 0.347 | 0.347 |
| b | 0.354 | 0.339 | 0.348 |
| $R_{Lmax}$ | 9.5 | 9.6 | 8.9 |
| $\eta_{max}$ | 0.980 | 0.981 | 0.980 | a PRIMARY CORE
b PRIMARY COIL
c SECONDARY CORE
d SECONDARY COIL
e ALUMINUM PLATE FOR PRIMARY SIDE SHIELDING
f ALUMINUM PLATE FOR SECONDARY SIDE SHIELDING
g ROOM TEMPERATURE
h EFFICIENCY

FIG.22

| HEAT CONDUCTIVITY AT ROOM TEMPERATURE W/mK | |
|---|---|
| COPPER | 398 |
| ALUMINUM | 236 |
| FERRITE | 5 |

CONTACTLESS POWER TRANSFER TRANSFORMER

CROSS REFERENCE TO RELATED APPLICATION

This application is a 35 U.S.C. 371 National Phase Entry Application from PCT/JP2013/065572, filed Jun. 5, 2013, which claims priority to Japanese Patent Application No. 2012-128459, filed Jun. 5, 2012, the disclosures of which are incorporated herein in their entirety by reference.

TECHNICAL FIELD

The present invention relates to a contactless power transfer transformer that transfers power to an electric vehicle and/or the like in a contactless manner, and relates to improvement in heat dissipation characteristic.

BACKGROUND ART

As a system for charging a battery of an electric vehicle or a plug-in hybrid car, there has been developing a method that transfers power to the vehicle in contactless manner by using electromagnetic induction, as illustrated in FIG. 18. Such a method transfers power from a primary coil (power transmission coil) 10 installed on the ground to a secondary coil (power reception coil) 20 of the contactless power transfer transformer, installed on a floor of the vehicle.

In the following Patent Literature 1, as the power transmission coil and the power reception coil of the contactless power transfer transformer used in this system, there is disclosed a configuration in which a winding wire (electric wire) is wound in a flattened circle and provided on one face of a flat plate ferrite magnetic core 21, 31, as illustrated in FIGS. 18A and 18B. Such a coil is referred to as "one-side wound coil" since the winding wires 22, 23 are wound only at one side of the ferrite magnetic cores 21, 31. FIG. 18A is a cross sectional view of the power transmission coil and the power reception coil, and FIG. 18B is a plan view of the power transmission coil and the power reception coil.

The power transfer efficiency of the contactless power transfer transformer that uses the one-side wound coil largely decreases when a vehicle is stopped at a position different from a vehicle stop position and the power transmission coil and the power reception coil do not oppose each other, or when a gap g between the power transmission coil and the power reception coil changes. In order to increase the permissible amount with respect to the positional variation or the variation of the gap g, it becomes necessary to increase the sizes of the power transmission coil and the power reception coil.

In the following Patent Literature 2, there is disclosed a contactless power transfer transformer with large permissible amount for the positional variation and the gap variation and that can be configured small in size. As illustrated in FIGS. 19A and 19B, in such a contactless power transfer transformer, the power transmission coil and the power reception coil are configured by winding the winding wires 62, 64 around the ferrite cores 61, 63. Such a coil is referred to as "both-sides wound coil". Further, as illustrated in FIG. 19B, the "square core" is used as the ferrite cores 61, 63. FIG. 19A is a cross sectional view of the power transmission coil and the power reception coil, and FIG. 19B is a plan view of the power transmission coil and the power reception coil.

In the contactless power transfer transformer, a main magnetic flux 67 that circles around the magnetic pole portions of the ferrite cores 61, 63 is generated. Additionally, bypassing leakage magnetic fluxes 68, 69 are generated on the non-opposing sides of the power transmission coil and the power reception coil. If the leakage magnetic fluxes 68, 69 enter an iron plate or the like of the floor of the vehicle, induced current flows through the iron plate and the iron plate is heated, thereby the power transfer efficiency decreases. In order to avoid the decrease in the power transfer efficiency, it is required to magnetically shield the leakage magnetic fluxes 68, 69 by arranging electromagnetic shielding metal plates 65, 66 configured by non-magnetic good conductors such as an aluminum plate at back faces of the power transmission coil and the power reception coil.

Further, in the following Patent Literature 3, in order to further decrease a size and weight of the both-sides wound coil, there is disclosed a power transmission coil and a power reception coil as illustrated in FIGS. 20A to 20F. According to such a power transmission coil and a power reception coil, a ferrite core is configured in H-shape, parts arranged at both ends of the H-shape and being parallel to each other are provided as magnetic pole portions 41, 42, and a winding wire 50 is wound around a part 43 (the part connects between the magnetic pole portions) corresponding to a horizontal pole of the H-shape. FIG. 20A is a state in which the winding wire 50 is wound around the ferrite core 40, and FIG. 20D is a state in which the winding wire 50 is not wound around the ferrite core 40. Further, FIG. 20B is a cross sectional view taken along a line A-A of FIG. 20A, and FIG. 20C is a cross sectional view taken along a line B-B of FIG. 20A. Similarly, FIG. 20E is a cross sectional view taken along a line A-A of FIG. 20D, and FIG. 20F is a cross sectional view taken along a line B-B of FIG. 20D.

Here, a case is considered in which the power transmission coil and the power reception coil each configured by a both-sides wound coil by using this H-shape core are arranged to oppose each other with a spacing therebetween at a normal gap length of 70 mm and the power transfer of 3 kW is performed. In such a case, the following power transfer properties are obtained. In particular, the efficiency of the transformer is 95%, the permissible amount of positional variation in the left and right direction (y-direction in FIG. 20A) is ±150 mm, the permissible amount of positional variation in the front and back direction (x-direction in FIG. 20A) is ±60 mm, and the efficiency at which the normal gap length is increased to 100 mm is 92%.

CITATION LIST

Patent Literature

Patent Literature 1: Japanese Patent Application Laid-open No. 2008-87733
Patent Literature 2: Japanese Patent Application Laid-open No. 2010-172084
Patent Literature 3: Japanese Patent Application Laid-open No. 2011-50127

SUMMARY OF INVENTION

Problem to be Solved by the Invention

For the contactless power transfer of the moving body, fast charge that enables power transferring at short time is desired. In order to meet the needs, there has been developing a contactless power transfer transformer that is capable of transferring large electric power.

In the contactless power transfer system of a moving body that uses the electromagnetic induction, a current at a frequency of approximately between 10 kHz to 200 kHz flows through the power transmission coil. As a result, a magnetic flux of high-frequency wave is generated. Therefore, at a core part of the power transmission coil and the power reception coil through which the magnetic flux flows, a temperature increases due to iron loss.

A size of the both-sides wound coil can be decreased; however, a heat capacity decreases therewith. Thus, the temperature tends to increase due to the iron loss of the core part or due to the copper loss of the winding wire. Therefore, in order to obtain a both-sides wound coil capable of transferring large electric power, the heat dissipation countermeasure is required.

FIG. 21 illustrates temperature raise test results measured in terms of a relationship between a power transfer time and a temperature of each portion of a power transmission coil and a power reception coil. Here, the power transmission coil and the power reception coil are configured by a both-sides wound coil for 10 kW and having H-shape core. In FIG. 21, the temperatures of the primary core, the primary coil, and the primary aluminum plate (corresponding to an electromagnetic shielding metal plate 65, which is an aluminum plate for magnetic shielding, illustrated in FIG. 19) of the power transmission coil, temperatures of the secondary core, the secondary coil, and the secondary aluminum plate (corresponding to an electromagnetic shielding metal plate 66, which is an aluminum plate for magnetic shielding, illustrated in FIG. 19) of the power reception coil, the room temperature, and the power transfer efficiency are measured over 50 minutes.

As is clear from FIG. 21, the core of the power reception coil reaches to a temperature of greater than or equal to 110° C. after 50 minutes from the beginning of the power transferring.

When such a high temperature is maintained, saturated magnetic flux density of the ferrite core decreases and there is a possibility that a coating of the winding wire (lits wire) melts. Accordingly, safety of when it is practically used might be decreased, and therefore, countermeasure is required.

The winding wire is present on a surface of the ferrite core. Therefore, the heat generated by the winding wire of the both-sides wound coil can be dissipated via a casing for containing the coil. Here, a portion of the casing is formed of a material having high heat conductivity (such as an aluminum material).

However, as illustrated in FIG. 22, because the ferrite core has a heat conductivity lower than aluminum and copper and further because the ferrite core is wound by the winding wire, the heat dissipation is difficult.

On the other hand, according to a contactless power transfer transformer that uses a one-side wound coil, the heat generated by the core can directly be dissipated from a side at which the ferrite core is not arranged because the winding wire is arranged only on one side of the ferrite core. Further, such a one-side wound coil has a size and a heat capacity larger than that of the both-sides wound coil. Therefore, the heat dissipation countermeasure is not of a large issue.

One aspect of the present invent is made in view of the foregoing, and an object of one aspect of the present invention is to provide a contactless power transfer transformer that can effectively dissipate heat of a ferrite core part, which is covered by a winding wire, of a both-sides wound coil.

Means for Solving Problem

According to one aspect of the present invention, a contactless power transfer transformer includes a both-sides wound coil. The both-sides wound coil includes an inter-magnetic-pole core portion between two magnetic pole portions. The winding wire is wound around a wound region of the inter-magnetic-pole core portion. The inter-magnetic-pole includes: a plurality of separate magnetic members that connect to each of the two magnetic pole portions, and are arranged with a spacing therebetween and in parallel with each other; and a heat conductor that is alternately arranged with respect to the separate magnetic members on a plane formed by the separate magnetic members so as to be in contact with the separate magnetic members. Heat generated by the separate magnetic members is guided to the outside of the wound region of the inter-magnetic-pole core portion through the heat conductor, and is dissipated.

According to the contactless power transfer transformer, the generated heat of the separate and magnetic member is dissipated to the outside via the heat conductor.

Further, according to another aspect of the present invention, heat conductor connecting portions that adhere to the heat conductor may be arranged at both end portions of the inter-magnetic-pole core portion arranged away from the wound region, and the heat guided through the heat conductor may be dissipated through the heat conductor connecting portions.

Further, according to still another aspect of the present invention, the two magnetic pole portions may each be configured by a magnetic magnetic-pole member that is longer than a width of the inter-magnetic-pole core portion connected to the magnetic pole portions, each of both end portions on one of faces of the inter-magnetic-pole core portion and away from the wound region may be arranged at a middle position in a longitudinal direction of each of the magnetic magnetic-pole members, each of the separate magnetic members may be connected to the two magnetic magnetic-pole members, each of the heat conductor connecting portions may be arranged at both end portions on other one of the faces of the inter-magnetic-pole core portion and away from the wound region, and the heat guided through the head conductor may be dissipated via the heat conductor connecting portions.

Further, according to still another aspect of the present invention, the heat conductor connecting portions may be connected to an electromagnetic shielding metal plate provided on a side not opposing a corresponding coil.

Further, according to still another aspect of the present invention, the heat conductor may be divided into half at a middle position between the heat conductor connecting portions arranged at the both end portions away from the wound region.

Further, according to still another aspect of the present invention, the heat conductor may be a rod-shape body made of aluminum or copper.

Further, according to still another aspect of the present invention, the heat conductor may include a pipe structure, and gas or liquid may flow through the pipe structure.

Further, according to still another aspect of the present invention, the pipe structure may be a portion of a heat pipe.

Further, according to still another aspect of the present invention, a heat dissipating fin or an air supply fan that cools the electromagnetic shielding metal plate may further be provided.

Further, according to still another aspect of the present invention, a magnetic body of each of the magnetic pole portions and the inter-magnetic-pole core portion may be ferrite.

Further, an amorphous core may be used for a portion of magnetic bodies of the magnetic pole portions and the inter-magnetic-pole core portion.

Further, a rated current of the transformer may be greater than or equal to 10 kW.

Effect of the Invention

According to one aspect of the present invention, a heat dissipation characteristic of a both-sides wound coil can be improved, and there can be provided a contactless power transfer transformer which uses a both-sides wound coil, is small in size, and is capable of performing first charge.

BRIEF DESCRIPTION OF DRAWINGS

FIG. 6 is a diagram schematically illustrating flow of heat in the both-sides wound coil of FIG. 1;

FIG. 11A is viewed from a different angle;

FIG. 12 is a diagram illustrating a temperature change of the contactless power transfer transformer according to an embodiment;

FIG. 14 is a diagram illustrating changes in constants due to presence and absence of an aluminum material heat conductor;

FIG. 22 is a diagram illustrating heat conductivities of copper, aluminum, and ferrite.

MODE(S) FOR CARRYING OUT THE INVENTION

Figure 1:
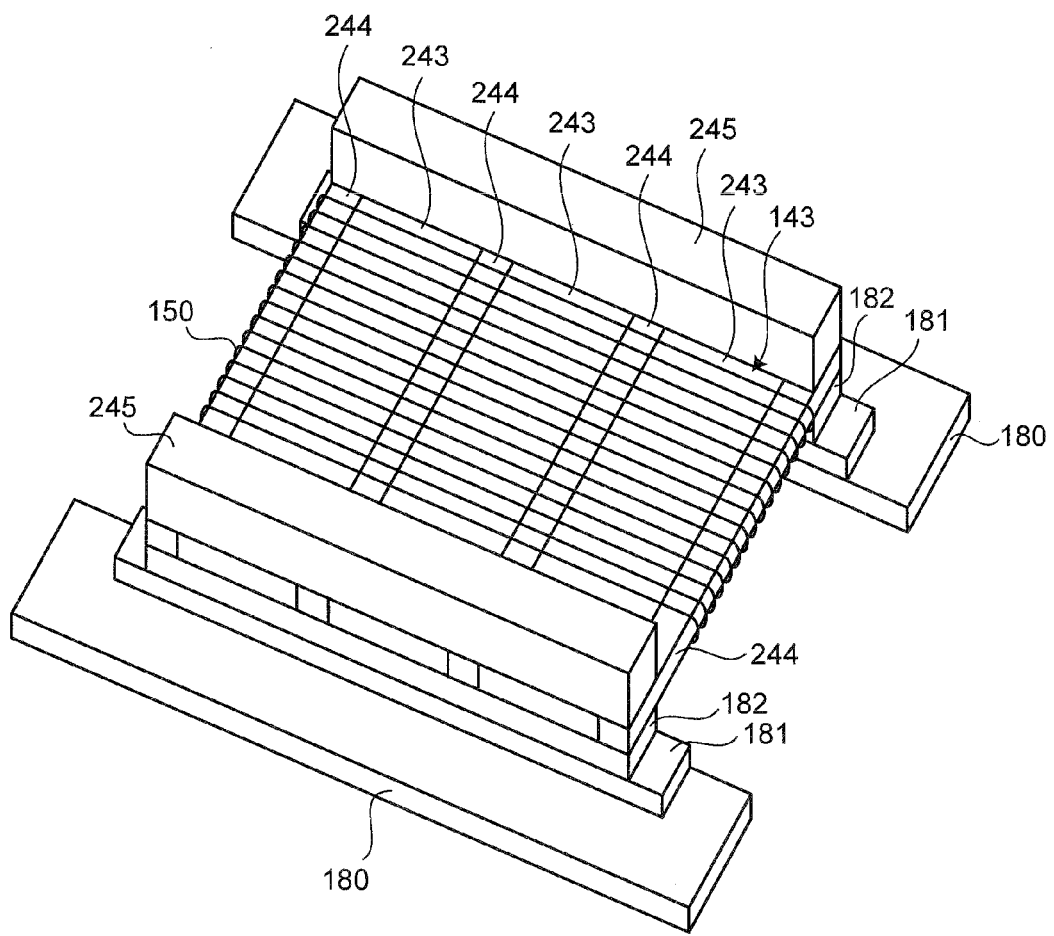
FIG. 1 is a diagram illustrating a both-sides wound coil of a contactless power transfer transformer according to an embodiment.
Figure 2:
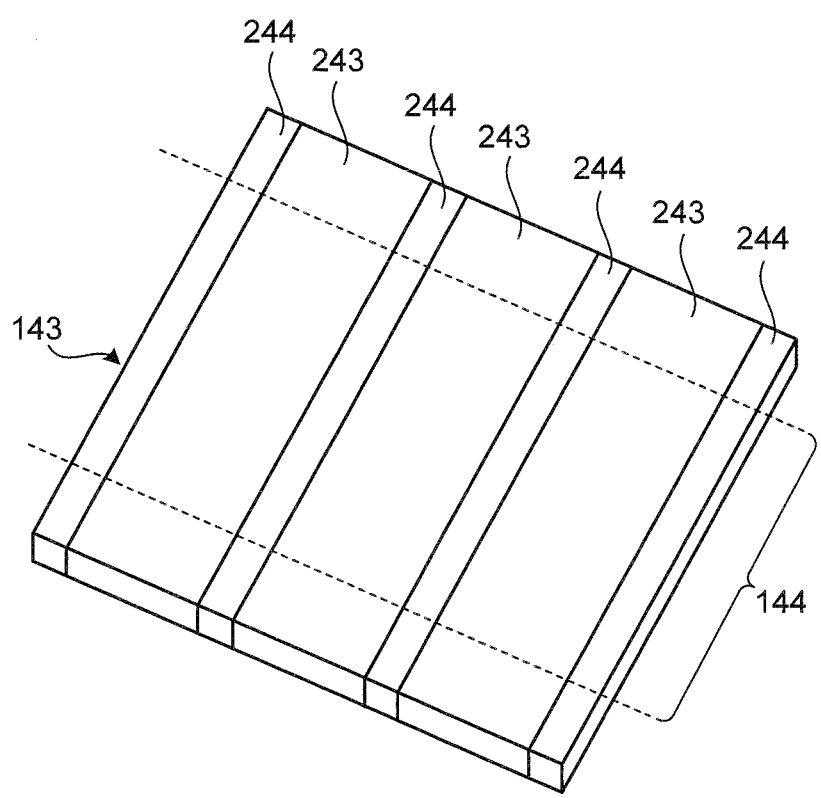
FIG. 2 is a diagram illustrating the inter-magnetic-pole core portion of the both-sides wound coil of FIG. 1.
Figure 3:
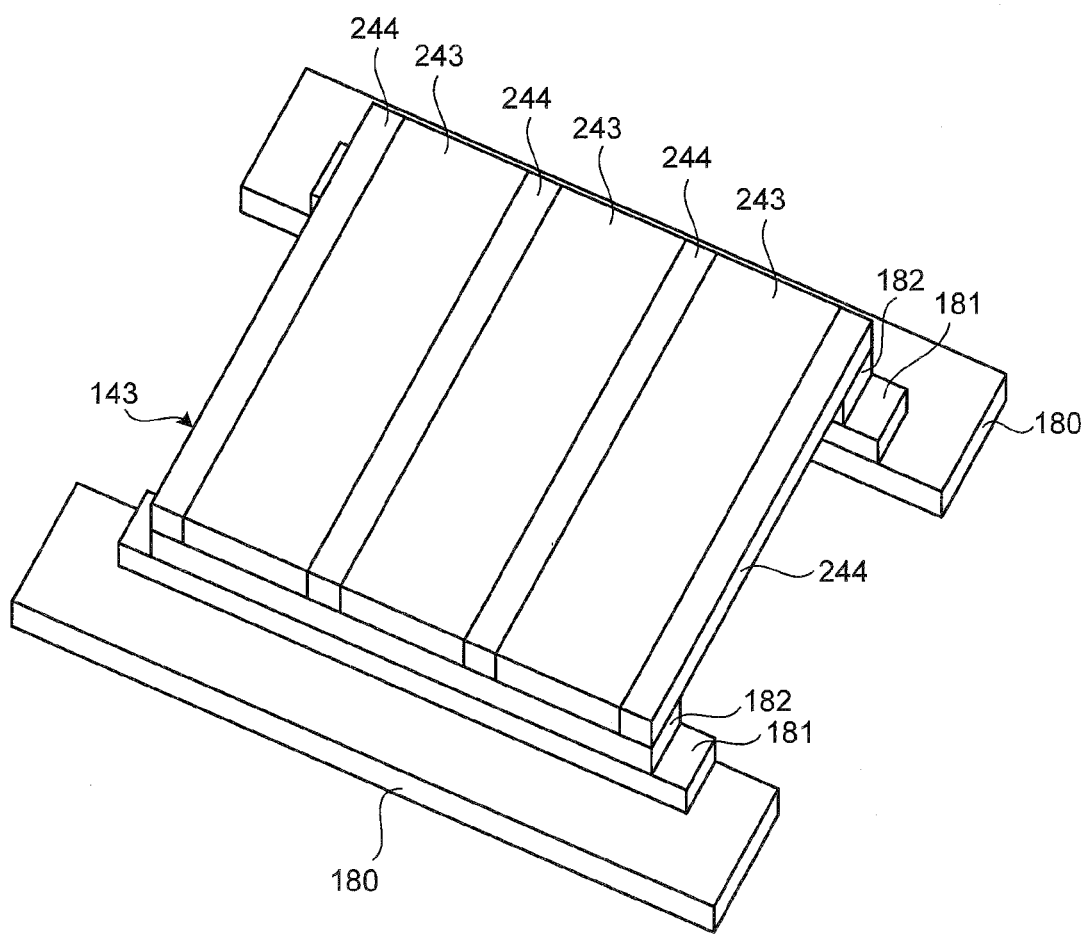
FIG. 3 is a diagram illustrating an H-shape core of the both-sides wound coil of FIG. 1.
Figure 4:
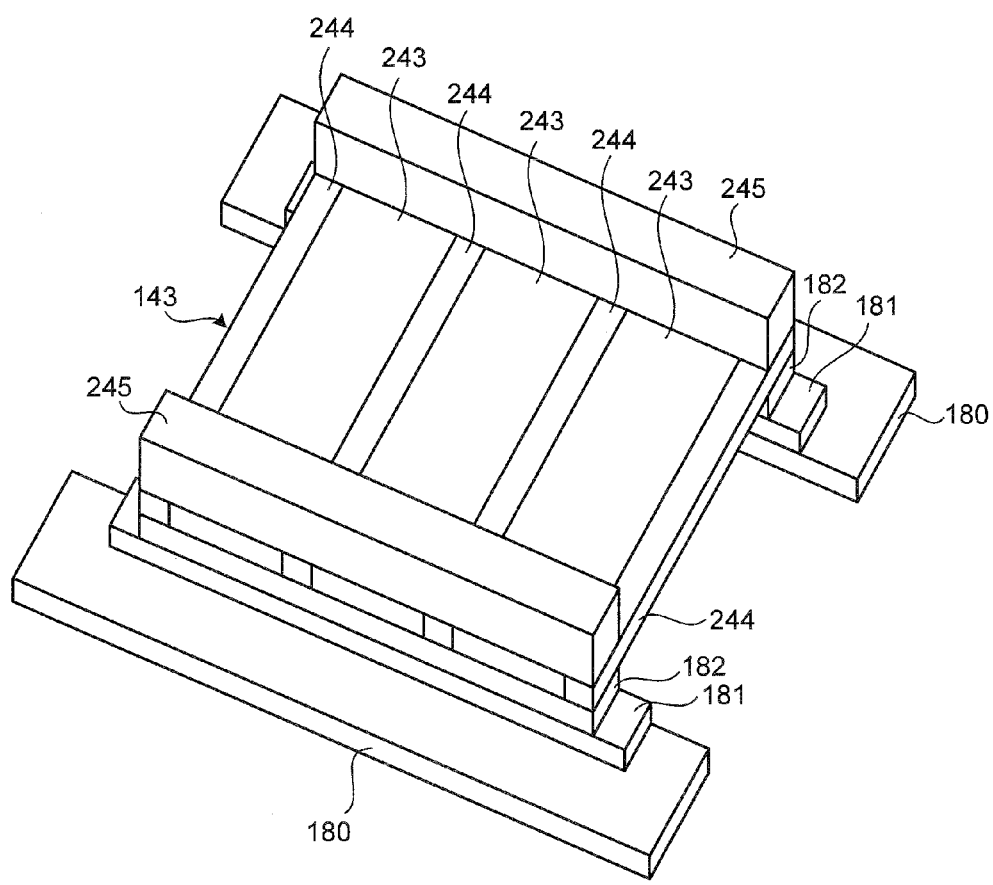
FIG. 4 is a diagram illustrating a state in which a heat conductor connecting portion is connected to the H-shape core of FIG. 3.

FIG. 1 schematically illustrates a configuration of a contactless power transfer transformer according to an embodiment of the present invention. FIGS. 2, 3, and 4 schematically illustrates a configuration on the way to a configuration of FIG. 1.

The contactless power transfer transformer includes a both-sides wound coil in which a winding wire (electric wire) 150 is wound around an inter-magnetic-pole core portion configuring a portion of an H-shape core. The winding wire 150 is wound around a winding zone 144 of an inter-magnetic-pole core portion 143, and is not wound around end portions of the inter-magnetic-pole core portion 143 away from the winding zone 144.

As illustrated in FIG. 2, separate magnetic members 243 and heat conductors 244 are alternately arranged with respect to each other. That is to say, the inter-magnetic-pole core portion 143 is configured by: a plurality of separate magnetic members 243 (ferrite is used in the contactless power transfer transformer as a magnetic body, thereby the separate magnetic member is referred to as a separate ferrite member in the following) that are arranged with a spacing therebetween and in parallel with each other; and a plurality of heat conductors 244 alternately arranged with respect to the separate ferrite members 243 so as to be in contact with a side face of the separate ferrite member 243 arranged at the end and to be in contact with both side faces of the adjacent separate ferrite members 243. Then, the separate ferrite members 243 and the heat conductors 244 are combined together into one flat plate. In the present embodiment, a width of the heat conductor 244 is set to be approximately ⅓ of a width of the separate ferrite member 243.

The separate ferrite members 243 function as a winding wire core of the H-shape core. On the other hand, the heat conductors 244 are formed of a material with high heat conductivity such as an aluminum material. The heat conductors 244 realize a function to guide heat generated at the separate ferrite members 243 at the time of power transferring to an end portion side of the inter-magnetic-pole core portion 143 away from the winding zone.

As illustrated in FIG. 3, both end portions of the inter-magnetic-pole core portion 143 located away from the winding zone 144 are connected to ferrite magnetic pole members 180 via lower layer ferrite plates 181, 182, respectively. Here, the ferrite magnetic pole members 180 configure the magnetic pole portions, respectively. The length of each of the ferrite magnetic pole members 180 is set to be longer than a width of the inter-magnetic-pole core portion 143 connected to the ferrite magnetic pole members 180 via the lower layer ferrite plates 181, 182. Further, the inter-magnetic-pole core portion 143 is connected to a middle portion of each of the ferrite magnetic pole members 180. The H-shape core is formed by: two ferrite magnetic pole members 180 that are in parallel with each other; and the inter-magnetic-pole core portion 143 that connects between the two ferrite magnetic pole members 180.

Figure 5A:
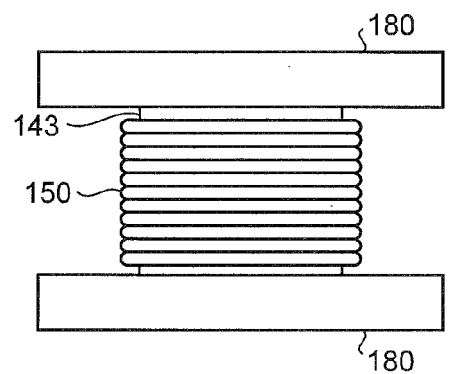
FIG. 5A is a plan view illustrating a configuration of the both-sides wound coil of FIG. 1.
Figure 5B:
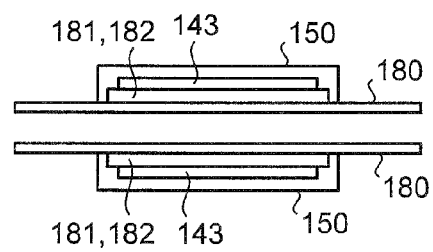
FIG. 5B is a side view of when the both-sides wound coils are arranged opposite each other.
Figure 5C:
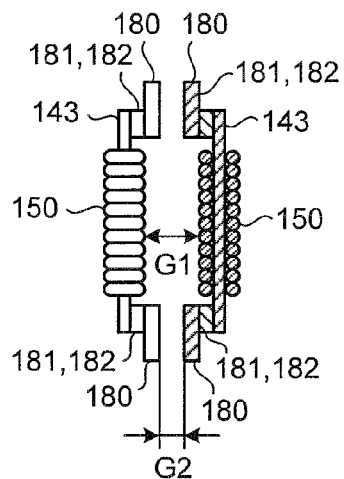
FIG. 5C is a diagram for explaining a case when the both-sides wound coils are arranged opposite each other, and illustrating a magnetic gap length G2 and a distance G1 between the winding wires of the both-sides wound coils.

In the H-shape core, the lower layer ferrite plates 181, 182 are laminated so as to raise a height of the upper most portion of each of the ferrite magnetic pole members 180 opposing a corresponding coil to a height equal to or greater than the height of the winding wire portion 150, as illustrated in FIGS. 5A to 5C. Here, FIG. 5A is a plan view illustrating a configuration of the both-sides wound coil, and FIG. 5B is a side view of when the both-sides wound coils of FIG. 5A are arranged opposite each other. Further, FIG. 5C illustrates a magnetic gap length G2 and a distance G1 between the winding wires of when the both-sides wound coils are arranged opposite each other.

As described above, the "legs" configured by the lower layer ferrite plates 181, 182 are attached to the ferrite magnetic pole members 180 of the magnetic pole portions. Consequently, it becomes possible to shorten the magnetic gap length G2 to a length equal to or less than the distance G1 between the winding wires. When the magnetic gap length is shortened, the coupling coefficient between the coils increases, and the power transfer efficiency and the maximum power transfer power increase.

Figure 19A:
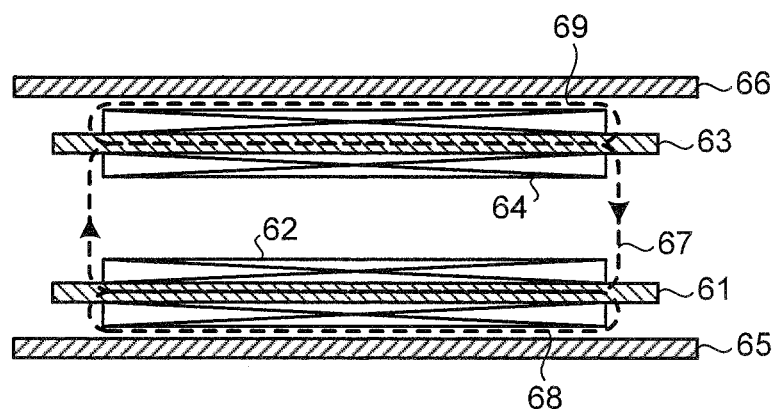
FIG. 19A is a cross sectional view illustrating a both-sides wound coil that uses a conventional square core.
Figure 19B:
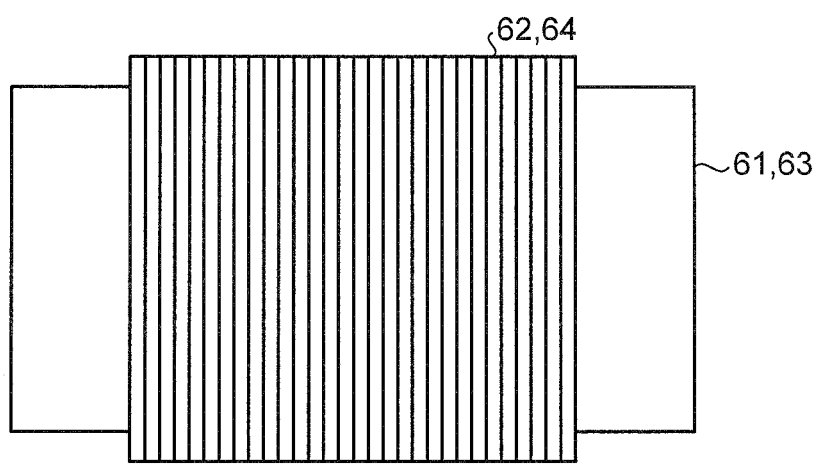
FIG. 19B is a plan view of FIG. 19A.
Figure 20A:
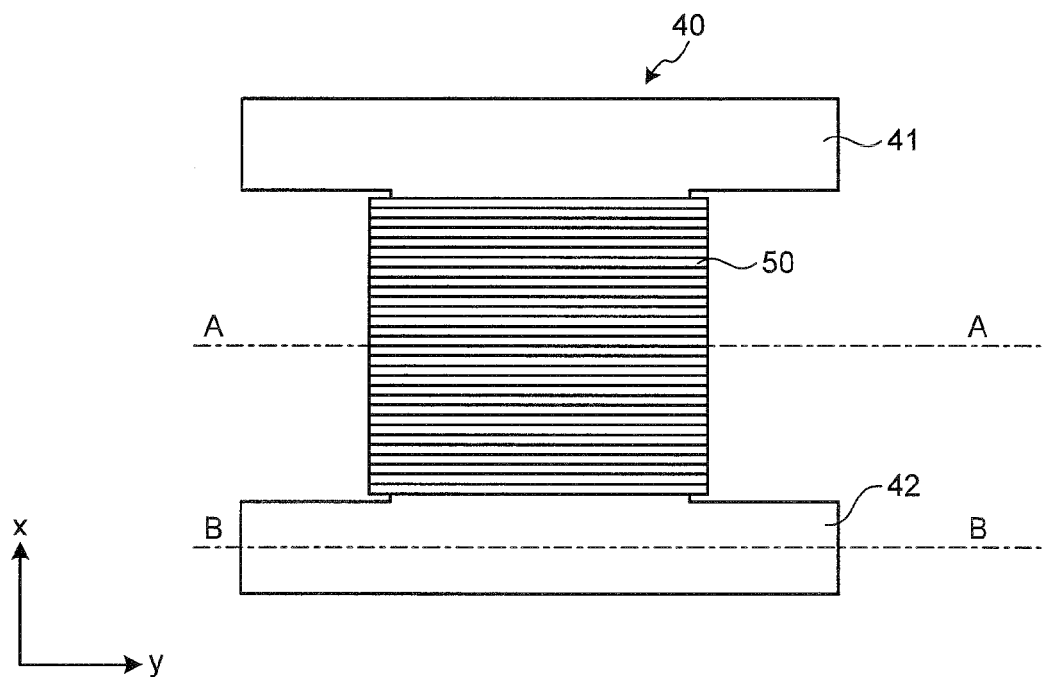
FIG. 20A is a diagram for explaining a both-sides wound coil that uses the conventional H-shape core, and illustrating a state in which the winding wire is wound.
Figure 20B:
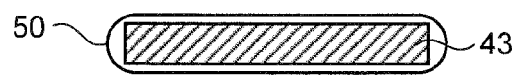
FIG. 20B is a cross sectional view taken along a line A-A of FIG. 20A.
Figure 20C:
FIG. 20C is a cross sectional view taken along a line B-B of FIG. 20A.
Figure 20D:
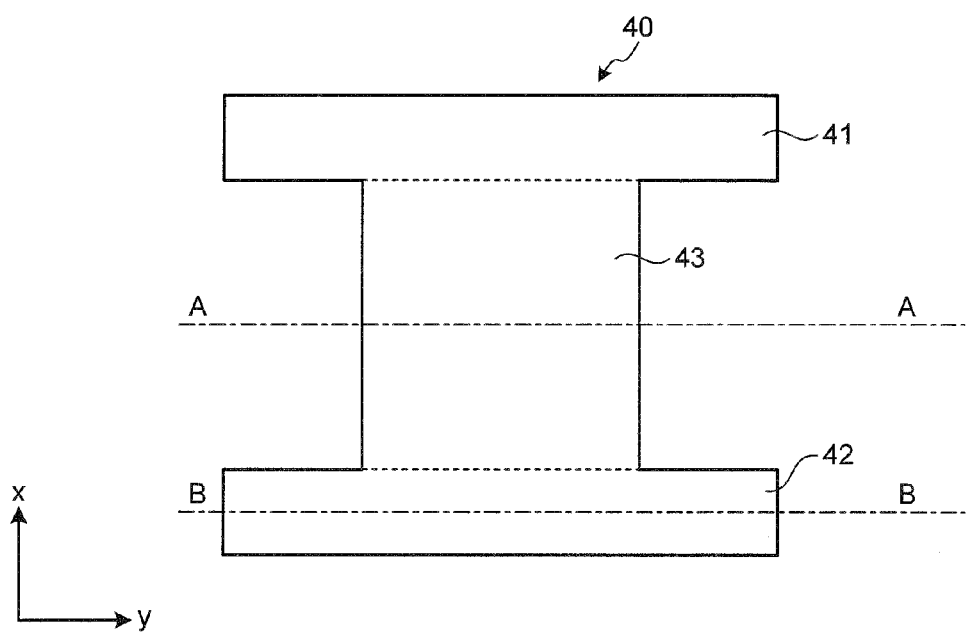
FIG. 20D is a diagram for explaining the both-sides wound coil that uses the conventional H-shape core, and illustrating a state in which a winding wire is not wound.
Figure 20E:
FIG. 20E is a cross sectional view taken along a line A-A of FIG. 20D.
Figure 20F:
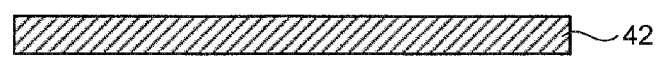
FIG. 20F is a cross sectional view taken along a line B-B of FIG. 20D.

As illustrated in FIG. 4, a heat conductor connecting portions 245 that are closely connected to the heat conductors 244 are arranged at one of the faces of the inter-magnetic-pole core portion 143 opposing other one of the faces at which the ferrite magnetic pole members 180 are connected via the lower layer ferrite plates 181, 182 and at the both end portions of the inter-magnetic-pole core portion 143 away from the winding zone 144. The heat conductor connecting portions 245 has a role in guiding the heat transferred from the heat conductors 244 to the outside of the contactless power transfer transformer. For example, the heat conductor connecting portions 245 are connected to an electromagnetic shielding metal plate (corresponding to the electromagnetic shielding metal plates 65, 66 of FIG. 19) arranged on a non-opposing face side, when the power transmission coil and the power reception coil oppose each other. Then, the heat transferred from the heat conductors 244 is communicated to the electromagnetic shielding metal plate via the heat conductor connecting portions 245, and dissipated.

FIG. 6 schematically illustrates the flow of heat communicated to the electromagnetic shielding metal plate 65 via the heat conductor connecting portion 245 from the heat conductors 244.

According to the contactless power transfer transformer of the present embodiment, the inter-magnetic-pole core portion 143 is configured by alternately arranging the separate ferrite members 243 and the heat conductors 244 with respect to each other on the same plain and in parallel with each other. The reasons why the inter-magnetic-pole core portion 143 of such a configuration is employed is because of the following.

Figure 7:
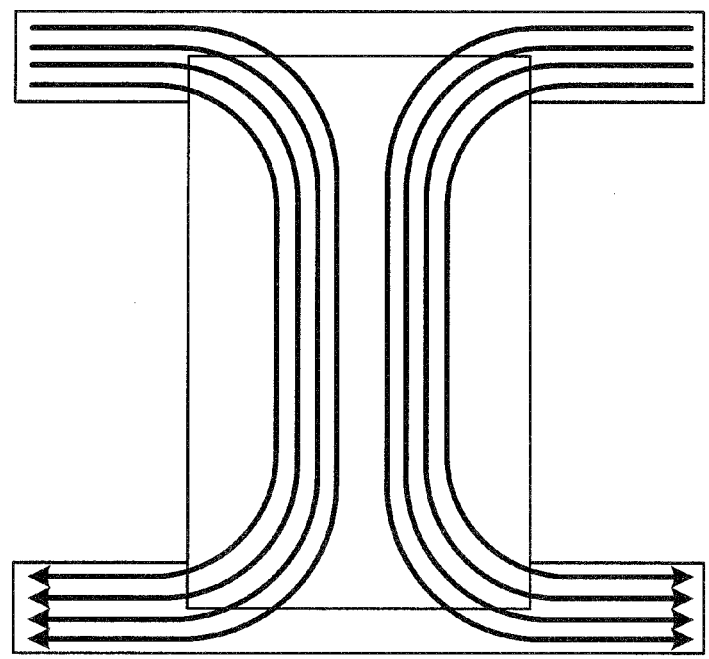
FIG. 7 is a diagram illustrating flow of a magnetic flux of the H-shape core.

Upon studying the magnetic flux distribution of the core of the both-sides wound coil, directions of the magnetic fluxes through the inter-magnetic-pole core portion are in parallel with each other heading from one of the magnetic pole portions toward other one of the magnetic pole portions. FIG. 7 illustrates a result of analysis of the flow of the magnetic fluxes of the both-sides wound coil having the H-shape core by using an electromagnetic field analyzing software.

Figure 8:
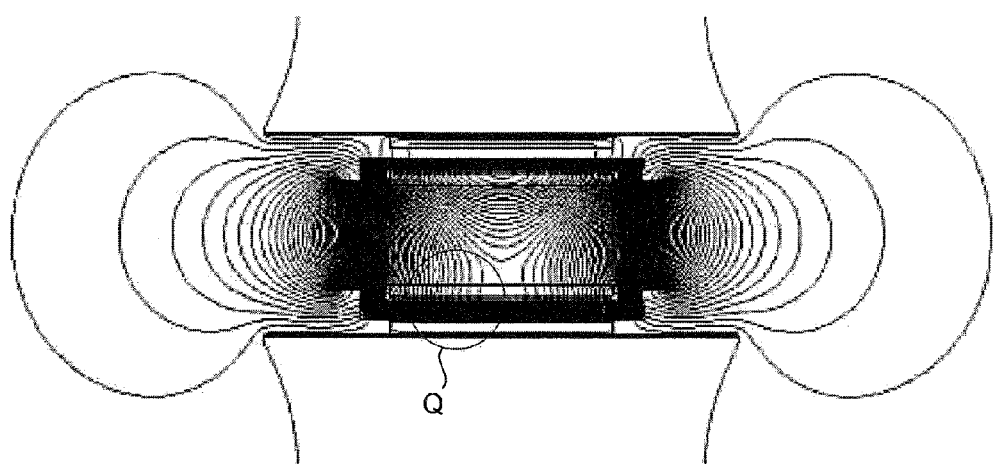
FIG. 8 is a diagram of a leakage magnetic flux of the H-shape core.

Further, FIG. 8 illustrates a result of analysis on the leakage magnetic fluxes of the both-sides wound coils each having the H-shape core and opposing each other.

Conductivity of metal is high. Therefore, if the magnetic flux flowing through the core or the magnetic flux leaking out from the core is shielded by metal, eddy current is generated and the power transfer efficiency is thereby decreased.

For example, if a metal plate is arranged between the inter-magnetic-pole core portion and the winding wire in order to take out the heat of the core, the power transfer efficiency decreases. This is because there exists a leakage magnetic flux from the ferrite member of the inter-magnetic-pole core portion toward directly thereabove as appearing in a part surrounded by a circle Q of FIG. 8, and because the metal plate shields such a leakage magnetic flux.

Figure 9:
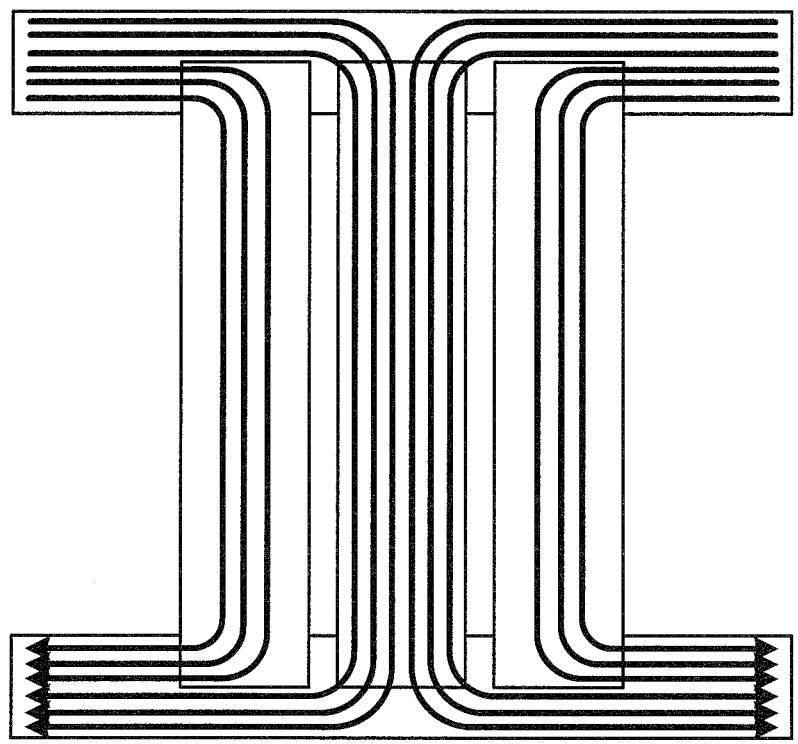
FIG. 9 is a diagram illustrating flow of the magnetic flux of the H-shape core having a separate ferrite member.

In contrast, if a plurality of ferrite plates are arranged with a spacing therebetween and in parallel with each other such as the separate ferrite members 243 configuring the inter-magnetic-pole core portion 143 of the present embodiment, the metal (the heat conductors 244 of the present embodiment) arranged in the spacing does not shield the leakage magnetic flux. Further, as illustrated in FIG. 9, parallel magnetic fluxes flows from one of the magnetic pole members to other one of the magnetic pole members through the ferrite plates. Thus, even if the metal is arranged on the flat plane formed by the ferrite plates, the magnetic fluxes flowing through the ferrite plates will not be shielded.

Therefore, according to the contactless power transfer transformer, the heat conductors 244 are arranged on the same plane as the separate ferrite members 243 and in parallel to the separate ferrite members 243, so that the heat conductors 244 does not block the magnetic flux flowing through the separate ferrite members 243 or the magnetic flux leaking out from the separate ferrite members 243.

Further, the heat conductor connecting portion 245 arranged on one of the faces of the inter-magnetic-pole core portion 143 opposing other one of the faces at which the ferrite magnetic pole member 180 is connected does not block the magnetic flux flowing through the separate ferrite members 243 or the leakage magnetic flux. This is because, the magnetic flux flows toward the ferrite magnetic pole member 180.

The measurement results of the temperature change in accordance with the power transfer time of the contactless power transfer transformer are explained.

Figure 10:
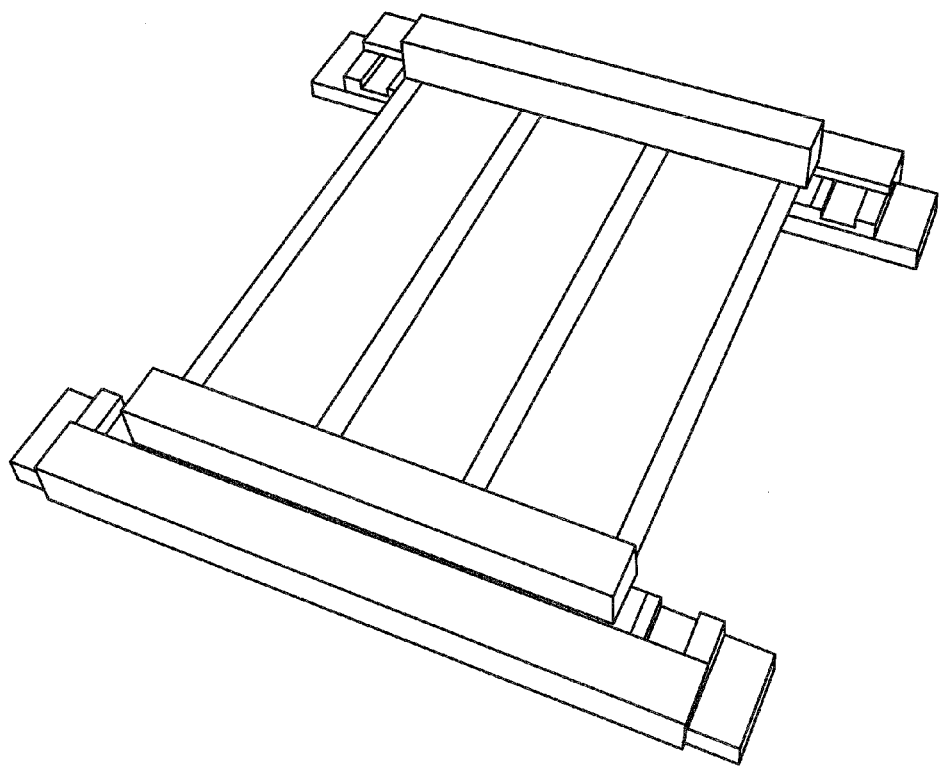
FIG. 10 is a diagram of the contactless power transfer transformer used for temperature measurements and from which the winding wire and a winding frame are removed.
Figure 11A:
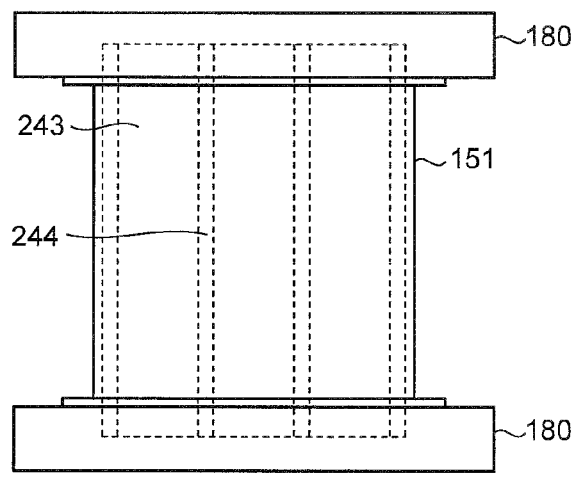
FIG. 11A is a plan view of a state in which a winding frame is attached to the contactless power transfer transformer of FIG. 10.
Figure 11B:
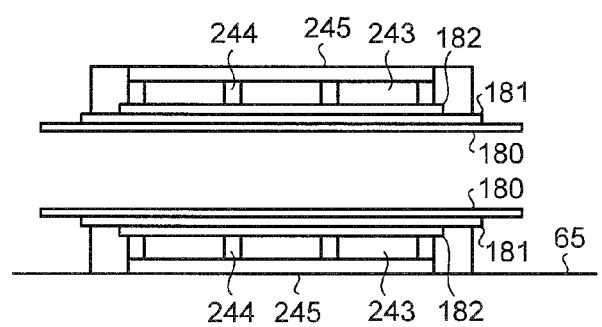
FIG. 11B is a side view of FIG. 11A.
Figure 11C:
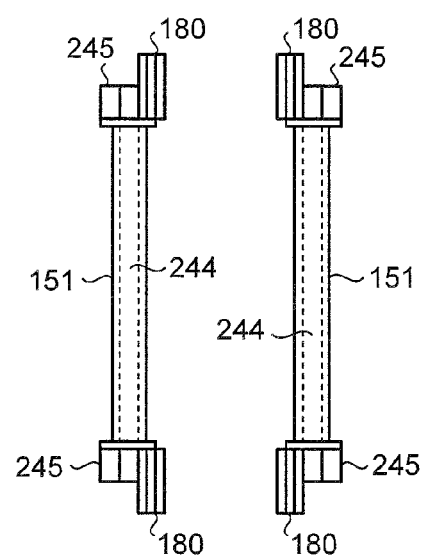
FIG. 11C is a side view of when

FIG. 10 illustrates the contactless power transfer transformer used for the measurement and in a state in which the winding wire and the electromagnetic shielding metal plate are removed. Further, FIG. 11A illustrates a plan view of the contactless power transfer transformer above the electromagnetic shielding metal plate 65, and FIG. 11B illustrates a side view of the contactless power transfer transformers opposing each other, when viewed from an angle of the ferrite magnetic pole member 180. FIG. 11C illustrates a side view of the contactless power transfer transformer opposing each other, when viewed from a different angle. Here, FIG. 11A illustrates a state in which the inter-magnetic-pole core portion is housed in the winding frame 151. The winding frame 151 defines the wound region 144 (see FIG. 2) of the winding wire (not illustrated), and the winding wire is wound around the outer circumference of the winding frame 151. In FIGS. 11A to 11C, the ferrite magnetic pole member 180, the separate magnetic member 243, the heat conductor 244, the heat conductor connecting portion 254, and/or the like, are also illustrated.

FIG. 12 is a temperature raise test result of when the present embodiment is applied. FIG. 12 illustrates a temperature change a of the primary core of the power transmission coil, a temperature change b of the primary coil of the power transmission coil, a temperature change e of the aluminum plate (electromagnetic shielding metal plate) for the primary side shielding of the power transmission coil, a temperature change c of the secondary core of the power reception coil, a temperature change d of the secondary coil of the power reception coil, and a temperature change f of the aluminum plate (electromagnetic shielding plate) for secondary side shielding, room temperature g, and power transfer efficiency h, measured over 150 minutes.

The secondary coil d reaches the temperature of 100° C. after 150 minutes since the beginning of the power transferring. In view of the temperature changes of FIG. 12, each temperature seems to be nearly at the saturation. The power transfer efficiency soon after the start of the power transferring is 94.0%, and increases to 94.6% after one hour.

Figure 21:
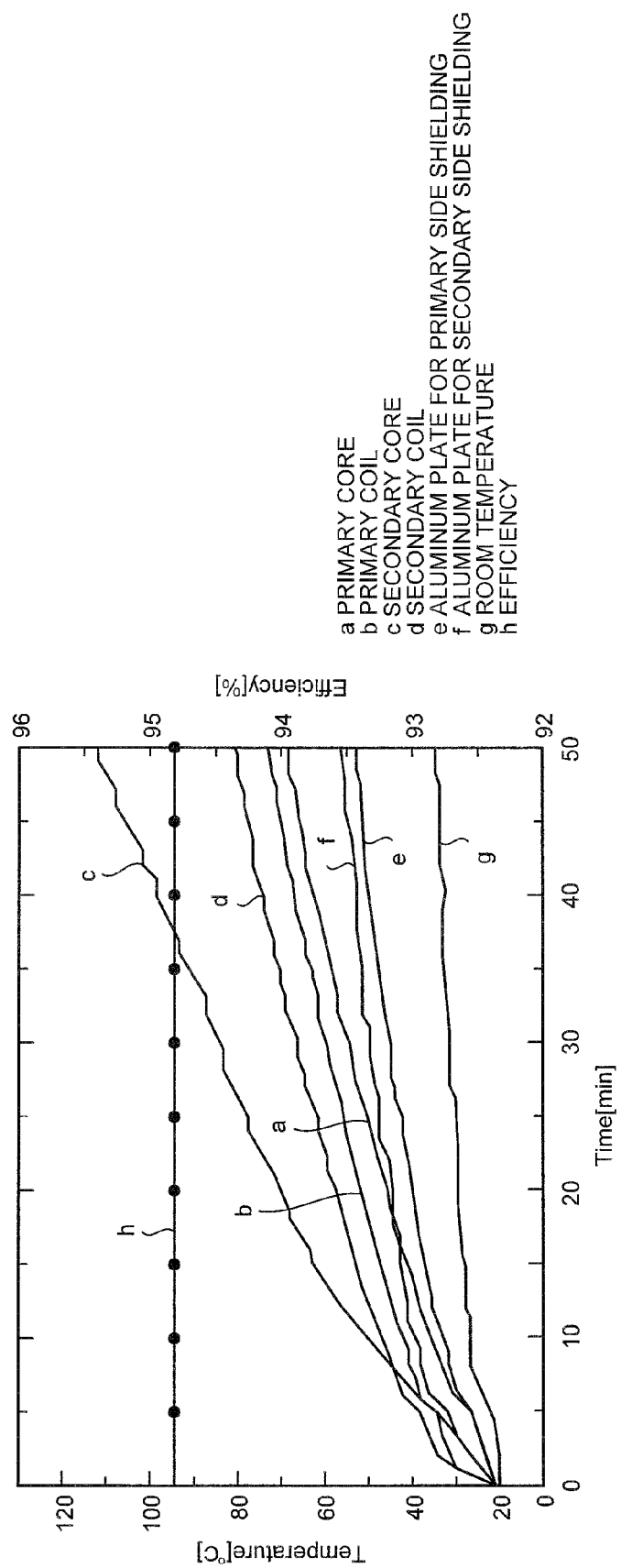
FIG. 21 is a diagram illustrating a temperature change of the conventional both-sides wound coil.

According to the temperature raise test result illustrated in FIG. 21 of when there are no heat dissipation countermeasure, the temperature of the secondary core reaches 110° C. only within 50 minutes. On the other hand, according to the temperature raise test of FIG. 12 of when the present embodiment is applied, the maximum temperature is approximately 100° C. even after 150 minutes, which is three times the aforementioned time period. Thus, the heat dissipating effect of the present embodiment is clear. Here, it is mentioned that the both tests are results of a natural cooling and without using a fan.

Figure 13:
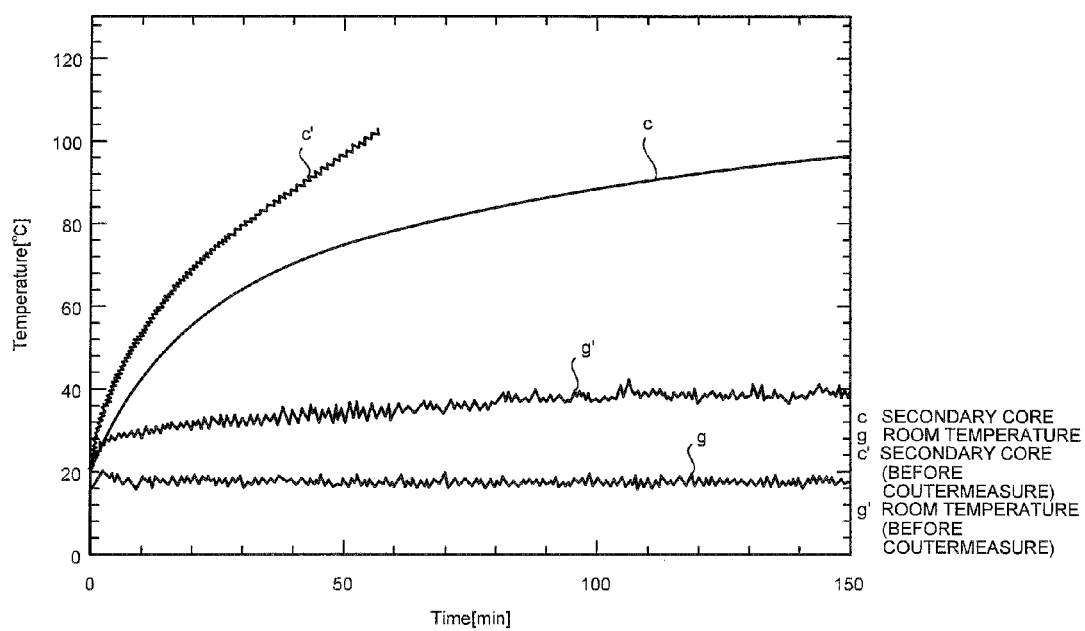
FIG. 13 is a diagram for comparing the temperature change of FIG. 12 and the temperature change of a conventional contactless power transfer transformer.

FIG. 13 illustrates a comparison between the temperature change c' of the secondary core recited in FIG. 21 and the temperature change c of the secondary core recited in FIG. 12. Further, FIG. 13 illustrates a comparison between the change g' in room temperature recited in FIG. 21 and the change g in room temperature recited in FIG. 12.

It can be confirmed from FIG. 13 that the heat dissipation characteristic of the contactless power transfer transformer of the present embodiment is largely improved.

Further, FIG. 14 illustrates comparison of constants among various contactless power transfer transformer. Here, the constants includes: constants (aluminum present) of a contactless power transfer transformer in which an aluminum material is used for the heat conductors 244 and the separate ferrite members 243 and the heat conductors 244 are alternately arranged for the inter-magnetic-pole core portion 143; constants (aluminum absent) of a contactless power transfer transformer in which only the separate ferrite members 243 are arranged with a spacing therebetween for the inter-magnetic-pole core portion 143; and constants (before countermeasure) of a contactless power transfer transformer in which the inter-magnetic-pole core portion 143 of the core is configured by a conventional ferrite member.

The influence due to inserting the heat conductors 244 made of an aluminum material into the core is a little apparent in the resistance (r1, r2). However, there are almost no influences on other constants, and the power transfer efficiency ηmax also hardly decreases.

Figure 15A:
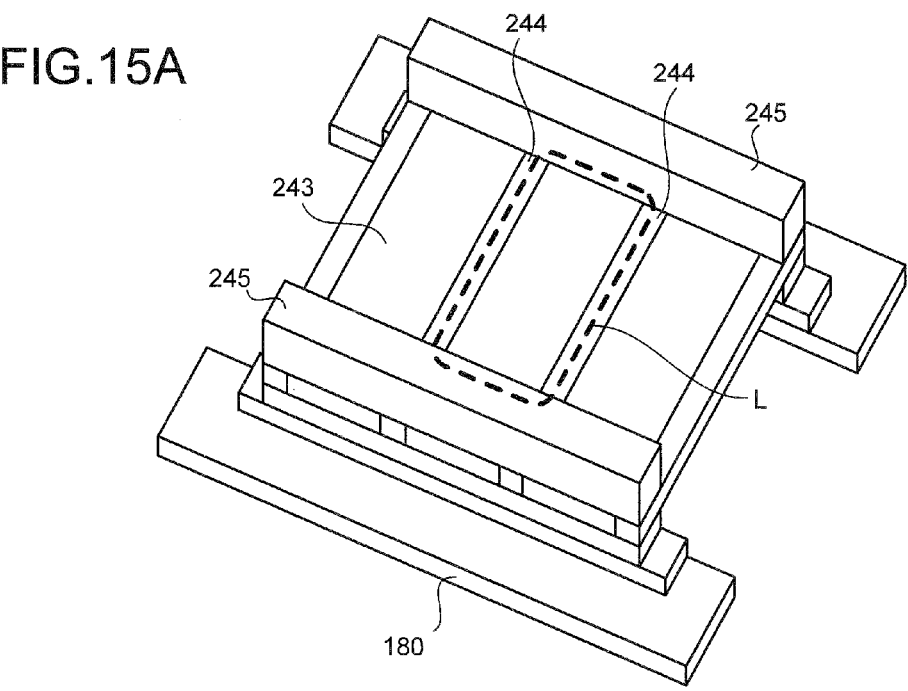
FIG. 15A is a diagram illustrating a conductive loop formed by the both-sides wound coil according to an embodiment.
Figure 15B:
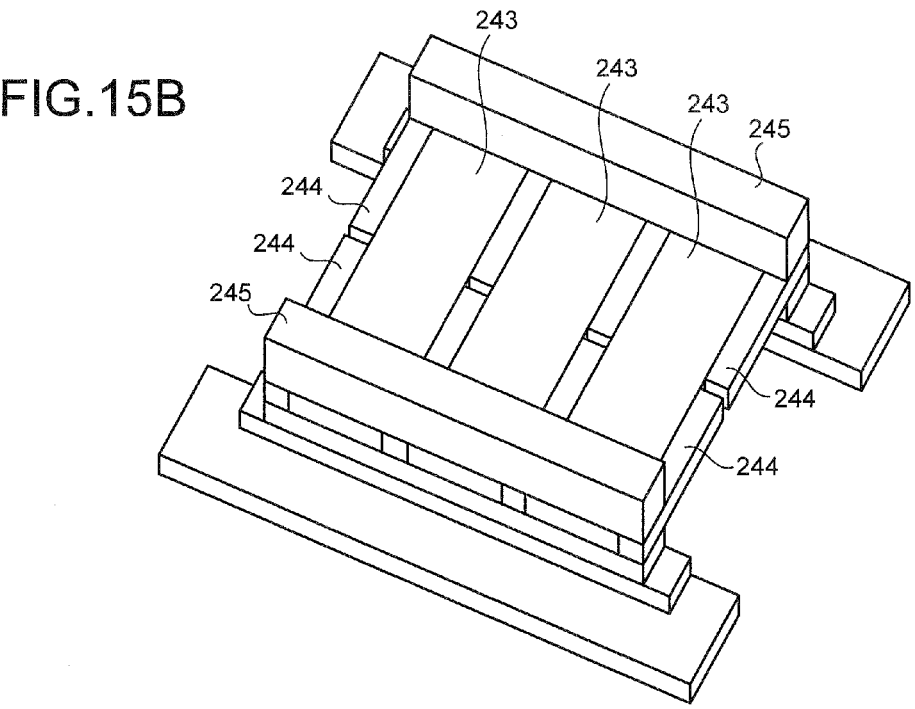
FIG. 15B is a diagram illustrating a modification in which a divided heat conductor is employed in the both-sides wound coil according to an embodiment.

The heat conductors 244 alternately arranged with respect to the separate ferrite members 243 in the inter-magnetic-pole core portion 143 of the both-sides wound coil forms a conducting loop L illustrated by a dotted line (traveling through the heat conductor 244 to one heat conductor connecting portion 245 to the adjacent heat conductor 244 to other one heat conductor connecting portion 245) in FIG. 15A. If there exists a magnetic flux which penetrates through the conducting loop L, a current flowing through the conducting loop L is generated and the power transfer efficiency might be decreased due to the copper loss. Thus, in order to avoid the decrease in the power transfer efficiency, the heat conductors 244 can be divided into half at the middle between the two heat conductor connecting portions 245, as illustrated in FIG. 15B. Each of the two divided heat conductors 244 is connected to one of the heat conductor connecting portions 245, thereby the heat dissipating performance does not decrease.

Further, the heat conductors 244 can be formed of copper and the like having high heat conductivity.

Further, the heat conductors 244 can have a tube structure having a cross section of a square shape in order to increase cooling performance by circulating gas or liquid within the tube structure. Further, the heat conductors 244 can have a heat pipe structure. In this case, circulating liquid absorbs heat at a high temperature portion and is thereby evaporated, releases the heat at a low temperature portion and is thereby liquefied, and the operations are repeated. Accordingly, efficiency in heat transferring from the high temperature portion to the low temperature portion increases.

Further, in order to improve the cooling effect of the electromagnetic shielding metal plates 65, 66, a heat dissipating fin or an air supply fan can be provided so as to cool the electromagnetic shielding metal plates 65, 66.

Figure 16:
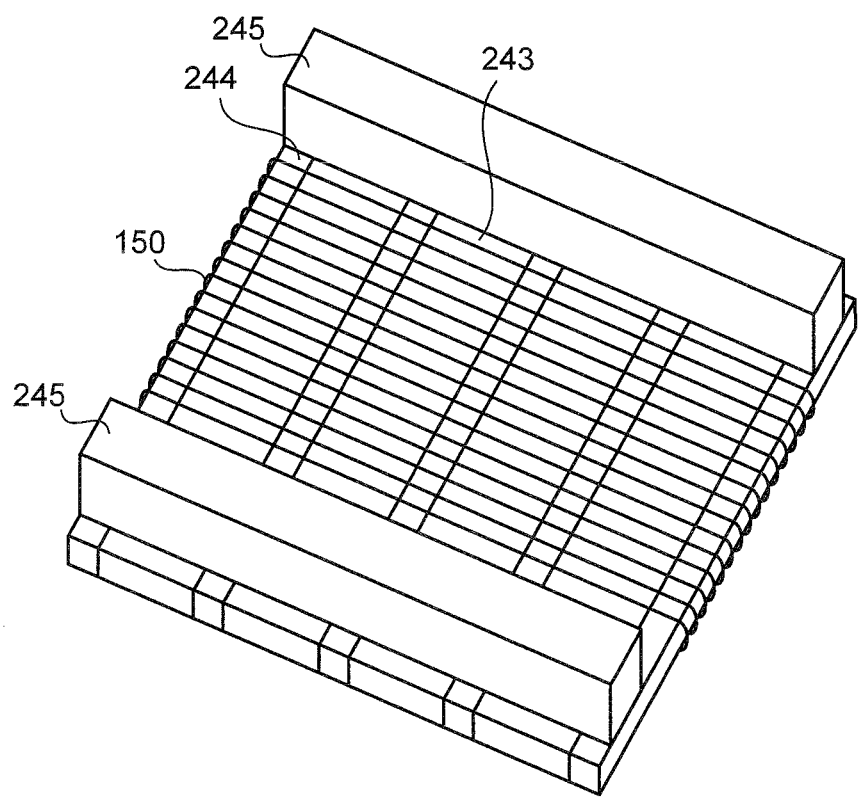
FIG. 16 is a diagram illustrating a modification in which a square core is employed in the both-sides wound coil according to an embodiment.
Figure 17:
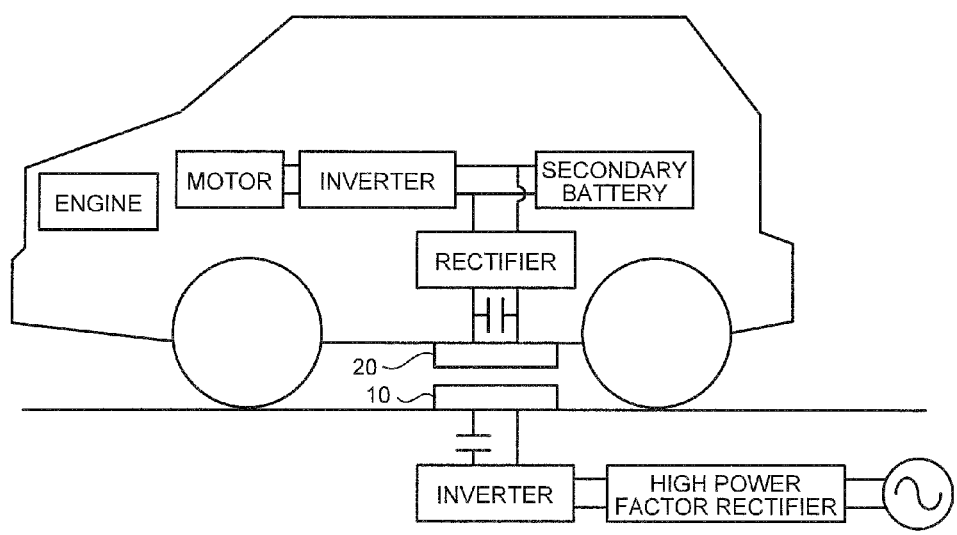
FIG. 17 is a diagram illustrating a contactless power transfer system with respect to a car.
Figure 18A:
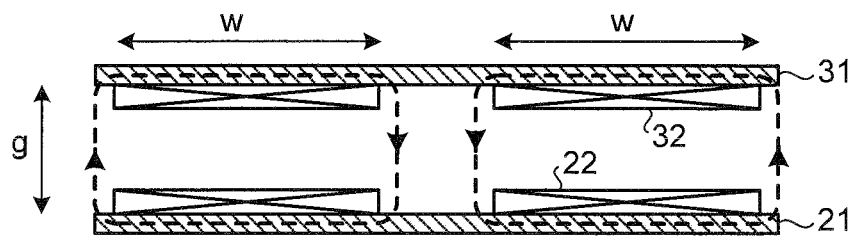
FIG. 18A is a cross sectional view illustrating a conventional one-side wound coil.
Figure 18B:
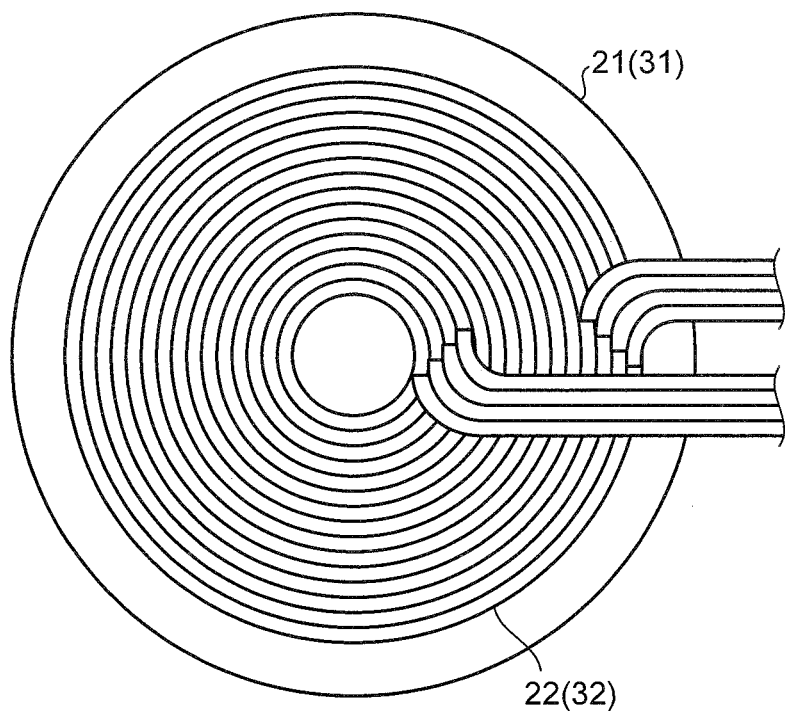
FIG. 18B is a plan view of FIG. 18A.

Further, the case in which the both-sides wound coil has the H-shape core is explained above. However, as illustrated in FIG. 16, the both-sides wound coil may have a square shape. In such a case, a configuration of the both-sides wound coil can be simplified.

Further, it is explained that the present embodiment uses the ferrite for the core. However, other magnetic bodies, such as an amorphous magnetic body, with less loss at the frequency used for the contactless power transferring can be used for a portion or for the entire core.

As described above, the contactless power transfer transformer of the present embodiment includes a both-sides wound coil between two magnetic pole portions. The both-sides wound coil includes: an inter-magnetic-pole core portion including a winding region covered by a winding wire; and a winding wire wound around the winding region of the inter-magnetic-pole core portion. The inter-magnetic-pole portion includes a plurality of separate magnetic members (magnetic bodies of the inter-magnetic-pole core portion) and heat conductors. Each of the separate magnetic members is connected to magnetic bodies (magnetic magnetic-pole members) of the two magnetic pole portions, and arranged with a spacing therebetween and in parallel with each other. The heat conductors are alternately arranged with respect to the separate magnetic members so as to be in contact with the separate magnetic members within a flat face formed by the separate magnetic members. The heat generated at the separate magnetic members is taken out to the outside of the winding region of the inter-magnetic-pole core portion through the heat conductors, and dissipated.

According to this contactless power transfer transformer, the generated heat of the separate magnetic members covered by the winding wire is dissipated to the outside through the heat conductors. At this time, when the heat conductors or the conducting loop configured by the heat conductors crosses the magnetic field lines traveling through the separate magnetic members or the magnetic field lines leaking to the outside from the separate magnetic members, the eddy current flows though the heat conductors and the eddy current loss is caused. Accordingly, the power transfer efficiency is decreased. Therefore, the heat conductors and the separate magnetic members are arranged on the same plane and in parallel with each other so that the heat conductors or the conducting loop configuring the heat conductors do not cross the magnetic field lines.

Further, according to the contactless power transfer transformer of the present embodiment, heat conductor connecting portions that adhere to the heat conductors are arranged at both end portions of the inter-magnetic-pole core portion away from the winding region. Then, the heat taken out through the heat conductors is dissipated via the heat conductor connecting portions. That is to say, the generated heat of the separate magnetic members covered by the winding wire is dissipated to the outside via the heat conductors and the heat conductor connecting portions.

Further, according to the contactless power transfer transformer of the present embodiment, each of the two magnetic pole portions is configured by a magnetic magnetic-pole portion having a length longer than a width of the inter-magnetic-pole core portion connected to the magnetic pole portions. Then, both end portions of the inter-magnetic-pole core portion on one of the faces thereof and away from the winding region are connected to a middle position of the magnetic magnetic-pole members in the elongated direction thereof, respectively. Further, at the both end portions of the inter-magnetic-pole core portion on other one of the faces thereof and away from the winding region, the heat conductor connecting portions adhered to the heat conductors are arranged, respectively. Accordingly, the heat taken out through the heat conductors is dissipated via the heat conductor connecting portions.

According to the contactless power transfer transformer, the length of the magnetic magnetic-pole member is set to be longer than the contact width of the inter-magnetic pole core portion so that the core member has the H-shape. Further, the heat conductor connecting portions which adhere to the heat conductors are arranged on a face opposite the face of the inter-magnetic-pole core portion connected to the magnetic magnetic-pole member. By such an arrangement, the main magnetic flux traveling through the inter-magnetic-pole core portion is directed toward the side of the magnetic magnetic-pole member. Accordingly, the magnetic field line does not cross the heat conductor connecting portion arranged on a side opposite the magnetic magnetic-pole member, thereby the eddy current loss is suppressed and the decrease in the power transfer efficiency can be prevented.

Further, according to the contactless power transfer transformer of the present embodiment, the heat conductor connecting portions are connected to the electromagnetic shielding metal plate installed on a non-opposing face side with respect to a corresponding coil. Therefore, the generated heat of the inter-magnetic-pole core portion covered by the winding wire is guided to the heat conductors that are in contact with the separate magnetic members, to the heat conductor connecting portions, and to the electromagnetic shielding metal plate, and is dissipated.

Further, according to the contactless power transfer transformer of the present embodiment, the heat conductors can be divided into half at a middle position between the two heat conductor connecting portions arranged at both end portions away from the winding region, respectively. By dividing the heat conductors as mentioned above, the conducting loop of the heat conductors crossing the magnetic flux can be prevented to be formed, thereby the decrease in the power transfer efficiency can be suppressed.

Further, according to the contactless power transfer transformer of the present embodiment, the heat conductors can be configured by a rod-shape body of aluminum or copper. The heat conductivity of the aluminum or the copper is 50 to 80 times that of the ferrite. Therefore, the heat generated at the separate magnetic members can effectively be taken out.

Further, according to the contactless power transfer transformer, the heat conductors may have the pipe structure so that gas or liquid flows therethrough. The heat dissipating effect can be increased by making the gas or the liquid, which has high heat conductivity, flowing within the pipe structure.

Further, according to the contactless power transfer transformer, a heat pipe may be used for the heat conductor. The heat pipe can efficiently move the heat from a high temperature portion to a low temperature portion by phenomenon in which liquid is evaporated at the high temperature portion and the vapor is liquefied at the low temperature portion. Therefore, heat dissipation can be performed efficiently.

Further, according to the contactless power transfer transformer of the present embodiment, in order to increase cooling effect of the electromagnetic shielding metal plate, a heat dissipating fin or an air supply fan can be provided to cool the electromagnetic shielding metal plate. By cooling the electromagnetic shielding metal plate as described above, the heat dissipation efficiency of the heat guided from the heat conductors to the heat conductor connecting portions and to the electromagnetic shield metal plates can be improved.

Further, according to the contactless power transfer transformer of the present embodiment, the magnetic pole portion or the magnetic body of the inter-magnetic-pole core portion can be formed by ferrite. Further, a portion of the magnetic pole portion or the magnetic body of the inter-magnetic-pole core portion can be formed by an amorphous core. Further, the rated power of a transformer of the contactless power transfer transformer can be greater than or equal to 10 kW.

As described above, the contactless power transfer transformer of the present embodiment has high heat dissipation characteristic. Therefore, the contactless power transfer transformer is small and can transfer large power of greater than or equal to 10 kW of the rated power. Consequently, the contactless power transfer transformer can be widely used for contactless power transfer of various moving bodies such as an electric vehicle or a plug-in hybrid car.

REFERENCE SIGNS LIST

10 POWER TRANSMISSION COIL
20 POWER RECEPTION COIL
21 FERRITE MAGNETIC CORE
22 WINDING WIRE
31 FERRITE MAGNETIC CORE
32 WINDING WIRE
40 FERRITE CORE
41 MAGNETIC POLE PORTION
42 MAGNETIC POLE PORTION
50 WINDING WIRE
61 FERRITE CORE
62 WINDING WIRE

63 FERRITE CORE
64 WINDING WIRE
65 ELECTROMAGNETIC SHIELDING METAL PLATE
66 ELECTROMAGNETIC SHIELDING METAL PLATE
67 MAIN MAGNETIC FLUX
68 LEAKAGE MAGNETIC FLUX
69 LEAKAGE MAGNETIC FLUX
143 INTER-MAGNETIC-POLE CORE PORTION
144 WOUND REGION
150 WINDING WIRE
151 WINDING FRAME
180 FERRITE MAGNETIC POLE MEMBER
181 LOWER LAYER FERRITE PLATE
182 LOWER LAYER FERRITE PLATE
243 SEPARATE FERRITE MEMBER
244 HEAT CONDUCTOR
245 HEAT CONDUCTOR CONNECTING PORTION

The invention claimed is:

1. A contactless power transfer transformer comprising:
a both-sides wound coil that includes an inter-magnetic-pole core portion between two magnetic pole portions, a winding wire being wound around a wound region of the inter-magnetic-pole core portion, wherein
the inter-magnetic-pole includes:
a plurality of separate magnetic members that connect to each of the two magnetic pole portions, and are arranged with a spacing therebetween and in parallel with each other; and
a heat conductor that is alternately arranged with respect to the separate magnetic members on a plane formed by the separate magnetic members so as to be in contact with the separate magnetic members, and
heat generated by the separate magnetic members is guided to the outside of the wound region of the inter-magnetic-pole core portion through the heat conductor, and is dissipated;
wherein heat conductor connecting portions that adhere to the heat conductor are arranged at both end portions of the inter-magnetic-pole core portion arranged away from the wound region, and
the heat guided through the heat conductor is dissipated through the heat conductor connecting portions.

2. The contactless power transfer transformer according to claim 1, wherein
the two magnetic pole portions are each configured by a magnetic magnetic-pole member that is longer than a width of the inter-magnetic-pole core portion connected to the magnetic pole portions,
each of both end portions on one of faces of the inter-magnetic-pole core portion and away from the wound region are arranged at a middle position in a longitudinal direction of each of the magnetic magnetic-pole members,
each of the separate magnetic members is connected to the two magnetic magnetic-pole members,
each of the heat conductor connecting portions is arranged at both end portions on other one of the faces of the inter-magnetic-pole core portion and away from the wound region, and
the heat guided through the head conductor is dissipated via the heat conductor connecting portions.

3. The contactless power transfer transformer according to claim 1, wherein the heat conductor connecting portions are connected to an electromagnetic shielding metal plate provided on a side not opposing a corresponding coil.

4. The contactless power transfer transformer according to claim 1, wherein the heat conductor is divided into half at a middle position between the heat conductor connecting portions arranged at the both end portions away from the wound region.

5. The contactless power transfer transformer according to claim 1, wherein a magnetic body of each of the magnetic pole portions and the inter-magnetic-pole core portion is ferrite.

6. The contactless power transfer transformer according to claim 1, wherein an amorphous core is used for a portion of magnetic bodies of the magnetic pole portions and the inter-magnetic-pole core portion.

7. The contactless power transfer transformer according to claim 1, wherein a rated current of the transformer is greater than or equal to 10 kW.

* * * * *